US005870688A

United States Patent [19]
Kanbara et al.

[11] Patent Number: 5,870,688

[45] Date of Patent: Feb. 9, 1999

[54] MISFIRE DIAGNOSTIC SYSTEM FOR INTERNAL COMBUSTION ENGINE

[75] Inventors: Yutaka Kanbara, Maebashi; Akira Uchikawa, Omama, both of Japan

[73] Assignee: Unisia Jecs Corporation, Atsugi, Japan

[21] Appl. No.: 749,396

[22] Filed: Nov. 15, 1996

[30] Foreign Application Priority Data

Nov. 15, 1995 [JP] Japan .................................... 7-296934

[51] Int. Cl.[6] .......................... G01M 15/00; F02D 45/00

[52] U.S. Cl. ........................... 701/110; 73/116; 73/117.3; 123/419; 123/436

[58] Field of Search .................................... 73/116, 117.2, 73/117.3; 123/419, 436; 364/431.03, 431.07, 431.08; 701/101, 110, 111

[56] References Cited

U.S. PATENT DOCUMENTS

| | | | |
|---|---|---|---|
| 5,041,979 | 8/1991 | Hirka et al. | 73/116 |
| 5,044,331 | 9/1991 | Suga et al. | 123/491 |
| 5,117,681 | 6/1992 | Dosdall et al. | 73/116 |
| 5,197,325 | 3/1993 | Tamura et al. | 73/117.3 |
| 5,426,587 | 6/1995 | Imai et al. | 364/431.07 |
| 5,452,604 | 9/1995 | Namiki et al. | 123/419 |
| 5,522,256 | 6/1996 | Hashimoto et al. | 73/116 |
| 5,567,873 | 10/1996 | Toyoda | 73/117.3 |

FOREIGN PATENT DOCUMENTS

| | | |
|---|---|---|
| 5-17172 | 5/1993 | Japan . |
| 7-197845 | 1/1995 | Japan . |

*Primary Examiner*—George M. Dombroske
*Attorney, Agent, or Firm*—Foley & Lardner

[57] ABSTRACT

A misfire diagnostic system for an Internal combustion engine comprises a crank-shaft angle sensor for monitoring a crankshaft angular velocity reflecting a combusting condition of each of engine cylinders, and a control unit for calculating an angular-velocity correction factor of each of the engine cylinders on the basis of the angular velocity in every engine operating region only under a stable engine operating condition. The control unit corrects the angular velocity by the angular-velocity correction factor of each of the engine cylinders for every engine operating region. The presence of a misfire is accurately decided on the basis of the angular velocity corrected for every engine cylinder and for every engine operating region.

9 Claims, 4 Drawing Sheets

MISFIRE DIAGNOSTIC SYSTEM FOR INTERNAL COMBUSTION ENGINE

BACKGROUND OF THE INVENTION

1. Field of the Invention

The present invention relates to a misfire diagnostic system suitable for use in internal combustion engines, and specifically to an engine-misfire diagnostic system employing an engine crank-shaft angle sensor, often called "crank angle sensor" which often takes the form of a reference-mark pulse generator.

2. Description of the Prior Art

In recent years, there have been proposed and developed various engine misfire diagnostic systems a high-precision misfire diagnosis. It is very important to more precisely make an engine-misfire diagnosis in order to accurately perform injection- and ignition-timing control. Many conventional misfire diagnostic systems usually utilize a so-called crank angle sensor for monitoring or detecting a combusting condition of each individual engine cylinder. Turning power, produced during combustion stroke at each engine cylinder, is correlated to a change in angular velocity of the engine crankshaft. The combusting conditions of individual cylinders, and the changes in angular velocity of the crankshaft are correlated to each other. A typical crankshaft angle sensing device includes a reference pulse generator, called a "reference sensor", and/or an angular-position pulse generator, called, "position sensor". A typical reference sensor is designed to generate a reference pulse signal at a predetermined timing (for example, at 90 degrees of crankshaft rotation before the top dead center (T.D.C.)) every predetermined crank angles such as 720°/n equal to 180° in case of a four-cylinder engine, where n denotes the number of engine cylinders, A typical position sensor is designed to generate a unit-angle pulse signal every unit crank angle such as 1° or 2° and also is provided for detecting an engine revolution speed. In some older-model cars, a photoelectric crank-shaft angle sensor is used. Many earlier-model cars use a magnetic crank-shaft angle sensor that takes a magnetic pulse pickup. Japanese Utility-Model Provisional Publication No. 5-17172 discloses an ignition-timing control system for an internal combustion engine in which fluctuations or variations in time duration of the reference pulse signal generated by the reference sensor are used for determining the presence or absence of a misfire, which may occur continually at a particular cylinder. In Japanese Utility-Model Provisional Publication No. 5-17172, an actual ignition timing of a cylinder, which cylinder is assigned to a combustion stroke executed in accordance with a predetermined firing order after the misfiring cylinder, is slightly retarded by a correction time based on both an engine revolution speed and a reference fuel-injection amount when the misfire is detected at the particular cylinder on the basis of the variations in the time duration of the reference pulse signals from the reference sensor. In other words, in the ignition-timing control system of Japanese Utility-Model Provisional Publication No. 5-17172, the presence or absence of engine misfire is determined on the basis of the fundamental concept that the combusting conditions of individual engine, cylinders are analogous with changes in angular velocity of the crankshaft (or with fluctuations in the time duration of the reference signal). However, even when the engine operating conditions are stable or steady without any engine misfires, the time duration (or time interval or time period) of the reference signal from the reference pulse signal generator, which duration is correlated to a combusting condition of each individual engine cylinder, can be affected by different factors, namely deviations in mechanical machining accuracy of a ring gear constructing a part of the crank-shaft angle sensing device, electrical deviations of input circuitry of a magnetic pickup, and/or irregularities in combustion among individual engine cylinders. It is desirable to eliminate these different factors to obtain correct or precise engine-misfire diagnosis. To filter out mechanical errors, i.e., variations in the reference-signal time interval, resulting from such deviations in mechanical machining accuracy or mechanical unevenness of the crank-shaft angle sensor, Japanese Patent Provisional Publication No. 7-197845 teaches the learning of mechanical errors included in the reference-signal time interval for a predetermined time interval of reference signals corresponding to 720 degrees of crankshaft revolution, when the engine is being cranked or during fuel-cut. However, irregularities in combustion among individual engine cylinders still remains. As may be appreciated, such irregularities in combustion among individual engine cylinders are different depending on engine operating conditions, namely engine speed and load. A learning value (learn value) obtained under only a particular condition is inadequate to make a high-precision misfire diagnosis.

SUMMARY OF THE INVENTION

Accordingly, it is an object of the invention to provide an improved misfire diagnostic system for an internal combustion engine which avoids the foregoing disadvantages of the prior art.

It is another object of the invention to provide a misfire diagnostic system for an internal combustion engine which can ensure a high-precision misfire diagnosis irrespective of the presence of a mechanical error and irregularities in combustion among individual engine cylinders.

In order to accomplish the aforementioned and other objects of the invention, a misfire diagnostic system for an internal combustion engine comprises sensor means for monitoring an angular velocity of an engine crankshaft, the angular velocity corresponding to a combusting condition of each engine cylinder, detection means for detecting a stable engine operating condition; calculation means for calculating an angular-velocity correction factor of each of the engine cylinders on the basis of the angular velocity corresponding to the combustion stroke of each of the engine cylinders, every engine operating region only under the stable engine operating condition, the correction factor reflecting fluctuations in combustion in the engine cylinders; correction means for correcting the angular velocity by the angular-velocity correction factor of each of the engine cylinders every engine operating region; and misfire decision means for deciding on the basis of the angular velocity corrected by the correction means every engine cylinder and every engine operating region, whether a misfire is present.

It is preferable that detected values of the angular velocity of each of the engine cylinders is averaged, and the calculation means calculates the angular-velocity correction factor of each of the engine cylinders on the basis of the averaged value of the detected values of the angular velocity. The calculation means may comprise means for calculating the angular-velocity correction factor corresponding to each of the engine cylinders on the basis of a deviation between an angular velocity corresponding to a combusting condition of a basic engine cylinder and an angular velocity corresponding to a combusting condition of another engine cylinder. A first condition representative of a steady engine running state may be provided as a condition for determining the stable engine operating condition. A second condition representative of a good-road running state may be provided as a condition for determining the stable engine operating condition. Additionally, a third condition, where fluctuations in the detected values of the angular velocity of each of the engine cylinders are below a predetermined threshold, may be provided as a condition for determining the stable engine operating condition.

DESCRIPTION OF THE PREFERRED EMBODIMENTS

Figure 1:
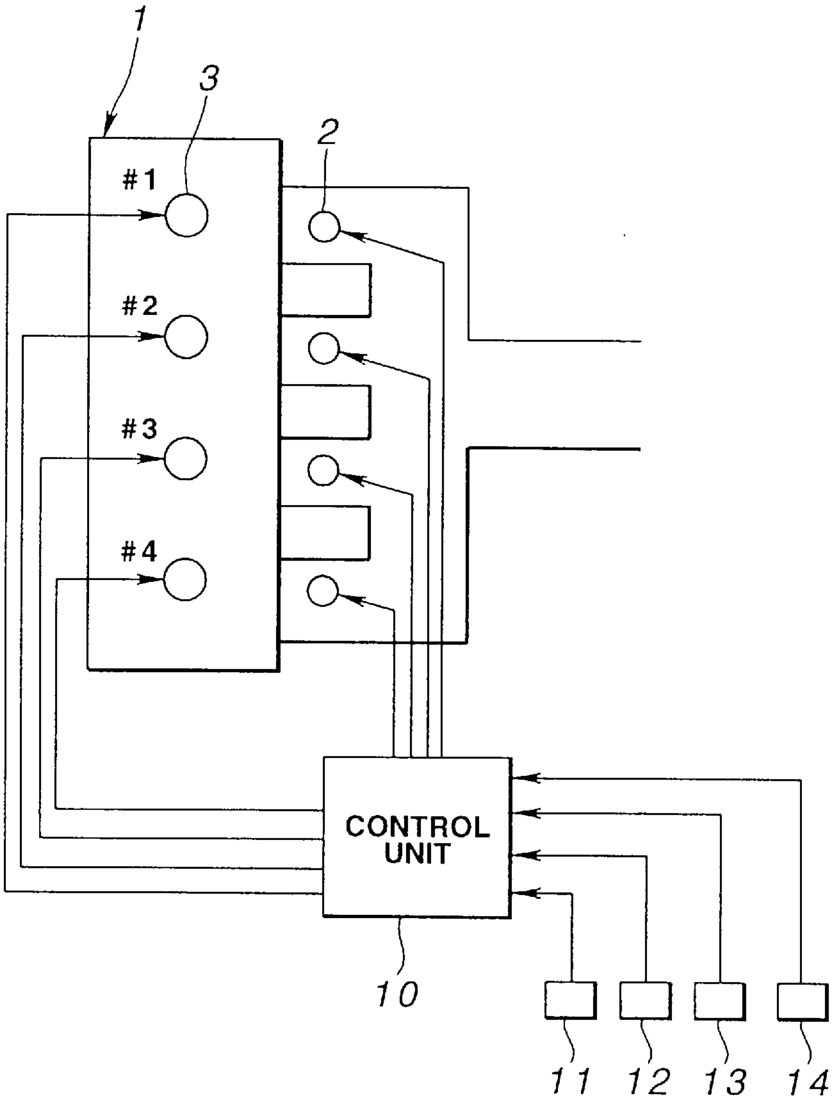
FIG. 1 is a schematic system diagram illustrating one embodiment of a misfire diagnostic system according to the invention.

Referring now to the drawings, particularly to FIG. 1, the misfire diagnostic system of the invention is exemplified in a four-cylinder engine 1 employing a firing order of 1-3-4-2. Referring now to FIG. 1, the misfire diagnostic system of the embodiment includes a control unit 10 accommodating therein a microcomputer for making a high-precision diagnosis of each individual engine cylinder misfire in accordance with routines programmed into the microcomputer, which routines will be hereinafter described in detail. Although it is not clearly shown in FIG. 1, the control unit 1 includes an input/output interface for receiving signals from various sensors, namely a crank-shaft angle sensing device 11, an air-flow meter 12, an idle switch 13, and a throttle-valve opening sensor 14. The crankshaft angle sensing device 11 will be hereinafter referred to as "crank angle sensor". The crank angle sensor 11 is provided for generating a reference pulse signal at a predetermined timing such as at 90° of crankshaft rotation before T.D.C. every predetermined crank angle, for example 720°/n, where n denotes the number of engine cylinders. In case of four-cylinder engines, 720°/n corresponds to 180°. In addition to the above, the crank angle sensor 11 is designed to generate a unit-angle pulse signal every unit crank angle, such as 1° or 2°, and also to detect an engine speed N. A cylinder discrimination signal, which is necessary to discriminate one engine cylinder from the other engine cylinders, is included in the reference pulse signal from the crank angle sensor 11. For example, a reference pulse signal corresponding to an engine cylinder #1 is discriminated from the other engine cylinders #2, #3 and #4 by lengthen a pulse-width time of the reference pulse signal corresponding to the engine cylinder #1 in comparison with pulse-width times of reference pulse signals of the other engine cylinders #2, #3 and #4. In the shown embodiment, the system employs a typical hot-wire mass air-flow meter as the air flow meter 12. As is well known, air mass flowing over the hot wire of the air-flow meter draws heat from it such that the wire's electrical resistance changes with temperature That is, the air mass or flow rate Q of air flowing through the air intake system can be measured as changes in the wire's electrical resistance. The control unit 10 calculates a reference fuel-injection amount Tp based on the air-flow rate Q measured by the sir-flow meter 12 and the engine speed N detected by the crank angle sensor 11, in accordance with the following expression:

$$Tp=k\cdot Q/N$$

where k is a constant.

Actually, the control unit 10 determines a final fuel-injection amount or a desired fuel-injection amount by properly compensating for the reference fuel-injection amount Tp in consideration of various factors, for example during engine cranking, during warm-up period, or during high engine load. Usually, a warm-up period correction factor, a starting-period correction factor, an air-fuel ratio correction factor, and/or an acceleration period correction factor arc used for compensation for the reference fuel-injection amount Tp Assuming that these correction factors are represented by the character COEF as generally referred to, the final fuel-injection amount $T_I$ is derived from an equation $T_I$=Tp·COEF. A feel injection is initiated by outputting a drive pulse signal of a pulse-width time (corresponding to the final fuel-injection amount $T_I$ calculated) to a fuel-injection valve 2 of each cylinder at a predetermined injection timing in synchronization with engine rotations. The control unit 10 also functions to determine an ignition timing on the basis of both the engine speed N from the crank angle sensor 11 and the reference fuel-injection amount Tp based on the engine speed N and the air flow rate Q for optimum ignition-timing control of an ignition coil 3 (or a spark plug) or optimum control of the time for current to flow in the ignition coil. On the other hand, the idle switch 13 is provided for detecting engine idling. The idle switch 13 is designed to be turned ON when the throttle valve is held at its fully closed position. The throttle-valve opening sensor 14 is provided to detect an opening TVO of a throttle valve. The control unit 10 is responsive to an On signal, which representative of a turned-ON state of the idle switch 13, and the engine speed indicative signal N from the crank angle sensor. The control unit 10 cuts fuel supply when the engine speed is above a predetermined speed in the presence of the On signal from the idle switch 13 to provide so-called fuel-cut control during deceleration.

Figure 2:
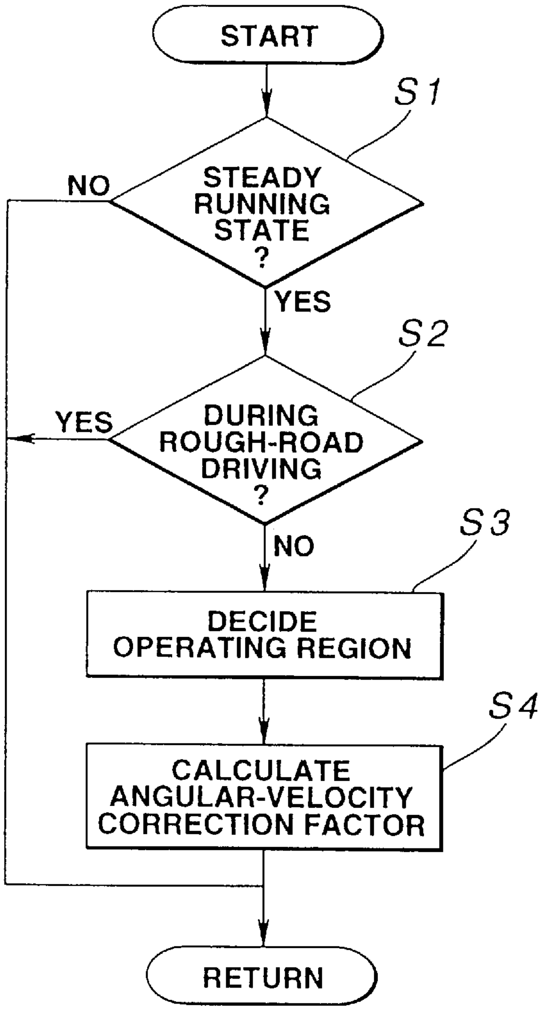
FIG. 2 is a flow chart illustrating a main routine for calculation of an angular-velocity correction factor of the misfire diagnostic system of the embodiment.
Figure 3:
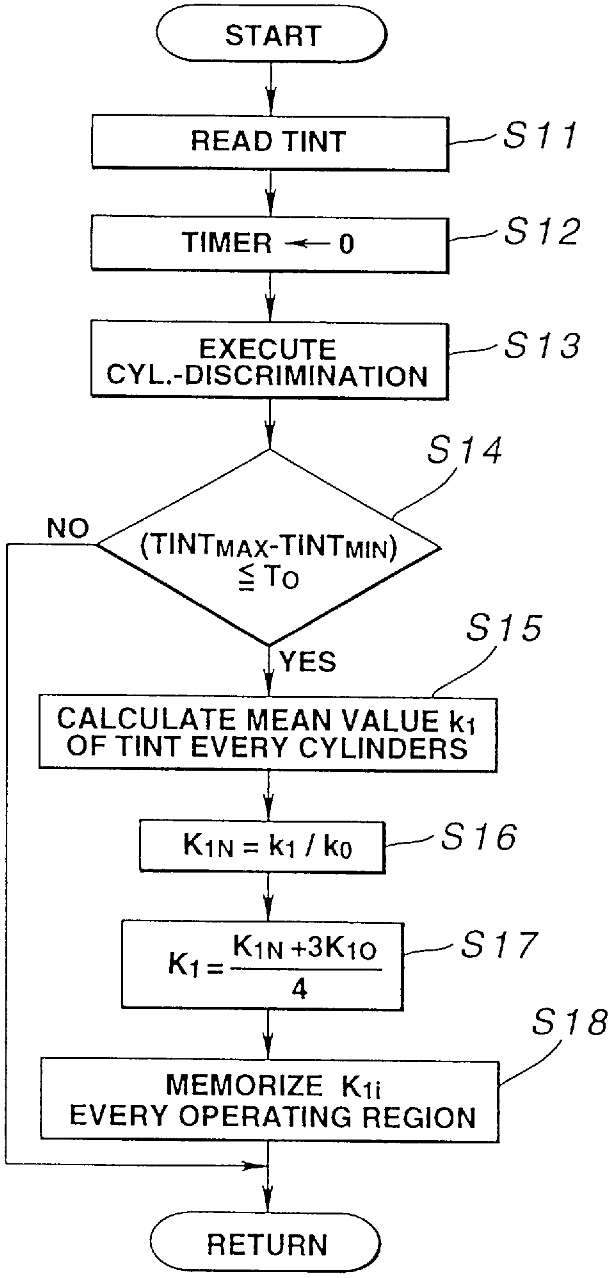
FIG. 3 is a flow chart illustrating a sub-routine for calculating an angular-velocity correction factor every engine operating region, related to step S4 of FIG. 2.
Figure 4:
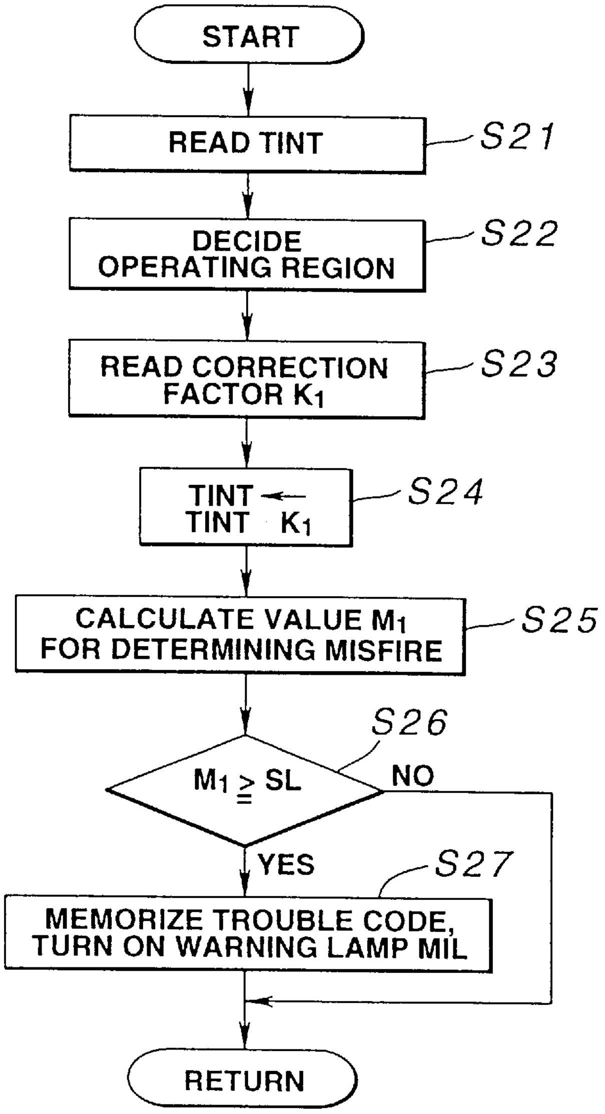
FIG. 4 is a flow chart illustrating a misfire diagnostic sub-routine.

The control unit 10 of the misfire diagnostic system made according to the invention makes a misfire diagnosis in accordance with the routines shown in FIGS. 2, 3 and 4.

Referring now to FIG. 2, there is shown a main routine through which an angular-velocity correction factor K1i is calculated for every predetermined engine operating region. In step S1, a test is made to determine whether the engine is in a steady running state. In more detail, a rate-of-change ΔTp in the calculated reference fuel-injection amount Tp and a rate-of-change ΔN in the detected engine speed N are first calculated on the assumption that the two parameters Tp and N faithfully reflect the engine operating conditions. Actually, the control unit 10 determines that the engine is in the steady state when the rate-of-change ΔN in the engine speed is below a first predetermined numeric value and additionally the rate-of-change ΔTp of the reference fuel-injection amount is below a second predetermined numeric value. When the answer to step S1 is affirmative (YES), step 2 proceeds in which a test is made to determine whether the vehicle is running on rough roads. On the assumption that variations in depression of the accelerator pedal can be correlated to a rough-road running state, a rate-of-change ΔTVO in the throttle opening TVO is calculated first in step S2. Second, the rate-of-change ΔTVO in the throttle opening is compared with a predetermined threshold value. The control unit 10 determines that the vehicle is running on rough roads when the rate-of-change ΔTVO is above the predetermined threshold value. When the answer to step S2 is negative (NO), step S3 proceeds. In step S3 a partition where the current engine operating region is included is decided on the basis of two parameters, such as the engine speed N and the reference fuel-injection amount Tp. The engine operating region is assigned to either one of predetermined plural partitions, each representative of a different engine operating region. The partitions are stored in a memory of the control unit in the form of look-up table. In the shown embodiment, the reference fuel-injection amount Tp is used instead of an engine load, since It is difficult to directly detect the engine load. Thereafter, step S4 proceeds. In step S4 in which an angular-velocity correction factor K1i corresponding to each individual engine cylinder (#1, #2, #3, #4) is calculated for every predetermined engine operating region The arithmetic processing of the angular-velocity correction factor K1i, indicated in step S4 of FIG. 2, is performed in accordance with the sub-routine shown in FIG. 3. The sub-routine of FIG. 3 is executed in synchronization with generation of the reference signal from the crank angle sensor 11.

In step S11, a counted value of a timer is read and then the counted value is defined as a time duration or time period or time interval TINT of the reference signal from the crank angle sensor. The timer is started from zero in synchronization with initiation of the previous sub-routine executed prior to the current sub-routine, and thus the counted value of the timer is identical to the time interval TINT between the previous reference signal and the current reference signal. As may be appreciated, a time interval TINT of the reference signal can be regarded as a value equivalent to the angular velocity of the crankshaft, since the time interval TINT reflects a reciprocal or inverse number of the crankshaft angular-velocity, corresponding to the combusting condition of each individual cylinder. In step S11, the time interval TINT obtained through the current sub-routine is memorized in a memory address of the memory of the control unit 10. The memory address is assigned only to the cylinder corresponding to the current reference signal and distinguished from the other memory address by a cylinder number. A plurality of time-interval data are, in turns, stored in the memory addresses distinguished from each other by a cylinder number through continual plural routines, by virtue of the cylinder discrimination procedure as will be later described in detail in reference to step S13. Actually, by repeatedly executing the sub-routine of FIG. 3, a predetermined number of time-interval data ($TINT_1$, $TINT_2$, . . . $TINT_{(n-1)}$, $TINT_{(n)}$) can be stored in the memory addresses for every cylinder number. $TINT_1$ represents the oldest data associated with a certain cylinder, whereas $TINT_{(n)}$ represents the newest data associated with the same. The oldest data $TINT_1$ is updated cyclically. In step S12, the timer is reset again to zero. In step S13, the cylinder discrimination is made on the basis of the cylinder discrimination signal included in the reference signal from the crank angle sensor 11, for determining the cylinder number of the engine cylinder corresponding to the current reference pulse signal from the sensor 11. In step S14, the control unit 10 selects the highest one $TINT_{MAX}$ of the predetermined number of time-interval data ($TINT_1$, $TINT_2$, . . . $TINT_{(n-1)}$, $TINT_{(n)}$) and the smallest one $TINT_{MIN}$ of the plural time-interval data ($TINT_1$, $TINT_2$, . . . $TINT_{(n-1)}$, $TINT_{(n)}$). The control unit calculates the difference ($TINT_{MAX}-TINT_{MIN}$) between the highest time-interval data and the smallest time-interval data for every individual cylinder. Thereafter, the difference ($TINT_{MAX}-TINT_{MIN}$) is compared with a predetermined threshold value $T_O$. The control unit determines that the engine is in the stable operating state (precisely, the engine cylinder of the cylinder number discriminated through step S13 is in the stable combusting state), where the difference ($TINT_{MAX}-TINT_{MIN}$) is below the predetermined threshold value $T_O$. Steps 1 and 2 of the main routine shown in FIG. 2 and step S14 of the sub-routine shown in FIG. 3 are provided to precisely determine whether or not the engine operating condition is stable and the vehicle running condition is steady. When the control unit determines that the engine is in the stable running state under a condition of ($TINT_{MAX}-TINT_{MIN}$)≦To, step S15 occurs. In step S15, the control unit calculates a mean value k1 of the predetermined number of time-interval data ($TINT_1$, $TINT_2$, . . . $TINT_{(n-1)}$, $TINT_{(n)}$) for every individual cylinder. The averaging process of step S15 is effective to enhance the reliability of the plural time-interval data detected by the crank angle sensor. Thereafter, step S16 occurs in which the control unit retrieves a reference time interval TINTref (=ko) based on the engine speed N from a predetermined look-up table (not shown) stored in the memory of the control unit. In step S16, a newest correction factor K1N of the time interval TINT of the reference signal is also calculated as a ratio (k1/ko) of the mean value k1 of the predetermined number of time-interval data ($TINT_1$, $TINT_2$, . . . $TINT_{(n-1)}$, $TINT_{(n)}$) to the reference time interval TINTref (=ko), The time-interval correction factor K1N is equivalent to a correction factor of an angular acceleration (i.e., a gradient of the crankshaft angular-velocity corresponding to the combusting condition of the engine cylinder discriminated through step S13). Instead of retrieving the reference time interval TINTref from the predetermined, stored look-up table stored, the reference time interval TINTref (=ko) may be derived or computed as a mean value of all time-interval data associated with all of the engine cylinders under the current engine operating condition.

In step S17, a weighted mean K1 of the new time-interval correction factor K1N obtained through the current routine of FIG. 3 and the older time-interval correction factor K10 obtained through the previous routine, is calculated in accordance with the following expression:

$$K1=z(K1N+3\cdot K10)/4$$

As may be appreciated, steps S14 to S17 contributes to the calculation of the angular-velocity correction factor.

In step S18, the weighted mean K1 is stored in the memory address of the memory (RAM), which address corresponds to the current engine operating region as the angular-velocity correction factor K1i (i=1, 2, 3, 4). K11, K12, K13 and K14 correspond to respective angular-velocity correction factors of the first, second, third and fourth cylinders. In this manner, the angular-velocity correction factor K1i of each individual cylinder (#1, #2, #3, #4) is calculated and stored for every engine operating region.

Referring now to FIG. 4, there is shown a sub-routine for engine-misfire diagnosis. The routine of FIG. 4 is executed in conjunction with the routine of FIG. 3. In step S21, the time interval TINT of the reference signal is read. The time interval TINT corresponds to the engine cylinder having the cylinder number discriminated through step S13 of FIG. 3 and currently subjected to a misfire diagnostic routine. In step S22, a partition, where the current engine operating region is assigned, is decided on the basis of both the engine speed N and the reference fuel-injection amount Tp. In step S23, the angular-velocity correction factor (or the time-interval correction factor) K1 (K1i, where i corresponds to the cylinder number discriminated through stop S14) is read from the memory (RAM) under the current engine operating condition. In step S24, the time interval TINT of the reference signal is corrected by multiplying the time interval TINT by the correction factor K1. In this manner, the reference-signal time interval TINT (equivalent to the angular velocity corresponding to the combusting condition of the engine cylinder subjected to the misfire diagnostic routine) is properly corrected. In step S25, a value M1 for determining misfire is calculated from the newly updated five time-interval data TINT (T1, T2, T3, T4, T5) computed through the latest five routines executed in continum, in accordance with the following expression.

$$M1=[3\times(T4-T5)+(T4-T1)]/T5^3$$

where T1 represents the current time interval of the reference signal corresponding to the cylinder currently subjected to the misfire diagnostic routine, T5 represents the time interval of the reference signal corresponding to the same cylinder one cycle before (because the engine is exemplified in case of a four-cylinder engine), and T4 represents the time interval of the reference signal corresponding to a cylinder fired just before the firing period of the cylinder currently subjected to the misfire diagnostic routine.

The value M1 will be hereinafter referred to as a "misfire judgment value".

In step S26, the misfire judgment value M1 is compared a predetermined slice level SL. The control unit 10 determines the presence of misfire in the cylinder subjected to the misfire diagnosis when the misfire judgment value Mi is greater than or equal to the predetermined slice level SL. Thereafter, step S27 occurs which a trouble code representative of the presence of misfire in the cylinder of the cylinder number discriminated through step S13 is stored in the memory, and simultaneously a warning lamp MIL is turned ON for indication of the misfire. As set out above, steps S24, S25 and S26 contributes to the determination of misfire in an engine cylinder. In lieu of the misfire judgment value M1, the following value M2 may be used as a value for determining whether a cylinder experiences a misfire in accordance with the following expression:

$$M2=[2\times(T3-T5)+2\times(T3-T1)]/T5^3$$

where T1 represents the current time interval of the reference signal corresponding to the cylinder currently subjected to the misfire diagnostic routine, T5 represents the time interval of the reference signal corresponding to the same cylinder one cycle before, and T3 represents the time interval of the reference signal corresponding to a cylinder fired prior to a cylinder fired just before the firing period of the cylinder currently subjected to the misfire diagnostic routine.

Furthermore, another misfire judgment value M3 may be calculated on the basis of the newly-updated three misfire judgment values M21, M22 and M23 obtained through the previously-explained expression for the misfire judgment value M2, stored in the memory, in accordance with the following expression:

$$M3=M22-M23$$

In the previously-explained embodiment, although the time interval TINT of the reference signal is used instead of detection of the angular velocity, corresponding to a combusting condition of each individual engine cylinder, the angular velocity of the crankshaft may be directly detected by computing the number of outputs of the unit-angle pulse signal from the crank angle sensor 11.

In the previously-discussed embodiment, the time-interval data TINT (each regarded as being equivalent to a crankshaft angular-velocity corresponding to a combusting condition of each individual engine cylinder) are read under a particular condition, i.e., during the stable engine operating condition. Additionally, the time-interval correction factors (or the angular-velocity correction factors) K1i corresponding to respective engine cylinders are set depending on the time-interval data TINT derived under the stable engine operating condition in consideration of fluctuations in combustion between respective engine cylinders for every engine operating region (i.e., every engine speed and load). Alternatively, after reading the time-interval data TINT during the stable engine operating condition, the time-interval correction factor (or the angular-velocity correction factor) corresponding to each individual cylinder may be calculated or set, every engine operating region, on the basis of a deviation obtained by comparing a time interval TINTo of a reference signal corresponding to a basic engine cylinder (for example, a cylinder of a cylinder number #1) with a time interval TINT of a reference signal corresponding to the other engine cylinder.

As will be appreciated from the above, in the misfire diagnostic system made according to the invention, an angular-velocity correction factor corresponding to each individual cylinder can be calculated for every predetermined engine operating region, on the basis of time interval data (substantially equivalent to an angular velocity) read under the stable engine operating condition or a deviation between a time-interval data TINTo of a reference pulse signal corresponding to a basic engine cylinder and a time-interval data of a reference pulse signal corresponding to the other engine cylinder. These time-interval data are read during the stable engine operating condition. A misfire diagnosis is made on the basis of the angular velocity correlated to each individual cylinder and properly corrected by the correction factor computed in every engine operating region. Therefore, a high-precision misfire diagnosis can be made with respect to each individual engine cylinder irrespective of the presence of a mechanical error such as irregularities in ring-gear teeth constructing a part of a crank angle sensor and irregularities in combustion among the individual engine cylinders. In addition, a predetermined averaging process (see step S15 of FIG. 3) is made with respect to a predetermined number of time-interval data derived under a stable engine operating condition, and thus an angular-velocity correction factor based on the time-interval data obtained through the averaging process satisfactorily reflects irregularities in combustion among the individual engine cylinders, thereby ensuring a precise compensation for the time interval TINT (i.e., the angular velocity) of the reference signal corresponding to each cylinder, accounting for irregularities in combustion of engine cylinders as well as a mechanical error of the crank angle sensor 11. Moreover, a first condition representative of a steady engine running state (see step S1), a second condition representative of a good-road running state (see step S2), and/or a third condition representative of a predetermined inequality ($TINT_{MAX}-TINT_{MIN}$)≦To (see step S14) are provided as a condition for determining a stable engine operating condition. Where the first condition, representative of the steady engine running state, is satisfied, angular-velocity correction factors (K1i) of individual engine cylinders can precisely reflect the crankshaft angular-velocity difference resulting from irregularities in combustion in the respective cylinders, as well as a mechanical error of the crank angle sensor under such stable engine operating conditions. Where a difference ($TINT_{MAX-TINTMIN}$) between positive ($TINT_{MAX}$) and negative ($TINT_{MIN}$) fluctuations in the detected angular velocity corresponding to each individual engine cylinder is below a predetermined threshold (To), the crankshaft angular velocities (i.e., time-interval data TINT) corresponding to combustion in respective engine cylinders are stable. In such a stable angular-velocity state, an angular-velocity correction factor (K1i) can be precisely set, satisfactorily reflecting irregularities in combustion in the respective cylinders and a mechanical error of the sensor. Thus, a high-precision misfire diagnosis can be achieved with respect to each of the engine cylinders.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. A misfire diagnostic system for an internal combustion engine having engine cylinders comprising:

sensor means for detecting an angular velocity of an engine crankshaft, said angular velocity corresponding to a combusting condition for each of said engine cylinders;

detection means for detecting a stable engine operating condition;

calculation means for calculating an angular-velocity correction factor of each of said engine cylinders on the basis of the detected angular velocity in every engine operating region based on at least an engine speed and an engine load under said stable engine operating condition, said correction factor reflecting fluctuations in combustion in said engine cylinders;

correction means for correcting said angular velocity by said angular-velocity correction factor of each of said engine cylinders in every engine operating region; and misfire decision means for deciding on the basis of said angular velocity corrected by said correction means, whether a misfire is present.

2. A misfire diagnostic system as set forth in claim 1, wherein said calculation means comprises means for averaging detected values of said angular velocity of each of said engine cylinders, said calculation means calculating said angular-velocity correction factor of each of said engine cylinders on the basis of an averaged value of said detected values of said angular velocity.

3. A misfire diagnostic system as set forth in claim 1, wherein said calculation means comprises means for computing a deviation between an angular velocity corresponding to a combusting condition for a basic engine cylinder and an angular velocity corresponding to a combusting condition for another engine cylinder and for calculating said angular-velocity correction factor corresponding to each of said engine cylinders on the basis of said deviation.

4. A misfire diagnostic system as set forth in claim 2, wherein a first condition representative of a steady engine running state is provided as a condition for determining said stable engine operating condition.

5. A misfire diagnostic system as set forth in claim 4, wherein a second condition representative of a good-road running state is provided as a condition for determining said stable engine operating condition.

6. A misfire diagnostic system as set forth in claim 5, wherein a third condition, fluctuations in said detected values of said angular velocity of each of said engine cylinders below a predetermined threshold, is provided as a condition for determining said stable engine operation condition.

7. A misfire diagnostic system as set forth in claim 6, wherein said sensor means includes a crank-shaft angle sensor for generating a reference pulse signal and a unit-angle pulse signal so that said angular velocity is monitored by detection of a time interval of said reference pulse signal, and an air-flow meter for monitoring a flow rate of air flowing through an air intake system, and wherein said detection means determines that the engine is in said steady engine running state when a rate of change in an engine speed based on said unit-angle pulse signal is below a first predetermined numeric value and a rate of change in a reference fuel-injection amount based on said engine speed and said flow rate of air is below a second predetermined numeric value.

8. A misfire diagnostic system as set forth in claim 7, wherein said sensor means includes a throttle-valve opening sensor for sensing a throttle opening, said detection means determines that said stable engine operating condition is satisfied when said throttle opening is less than a predetermined threshold value.

9. A misfire diagnostic system as set forth in claim 8, wherein said detection means determines that said stable engine operating condition is satisfied when a difference between maximum and minimum values of said detected values of said angular velocity of each of said engine cylinders is below a predetermined threshold.

* * * * *